(12) United States Patent
Di Giovanni et al.

(10) Patent No.: US 10,575,371 B2
(45) Date of Patent: Feb. 25, 2020

(54) LIGHT-TRANSMITTING PLATE

(75) Inventors: Albert Di Giovanni, Nogent sur Marne (FR); Marie Comte, Fontenay aux Roses (FR); Edouard Brunet, Paris (FR); Isabelle Melscoet-Chauvel, Bois le Roi (FR)

(73) Assignee: EUROKERA S.N.C., Jouarre (FR)

( * ) Notice: Subject to any disclaimer, the term of this patent is extended or adjusted under 35 U.S.C. 154(b) by 1007 days.

(21) Appl. No.: 13/807,847

(22) PCT Filed: Jun. 29, 2011

(86) PCT No.: PCT/FR2011/051511
§ 371 (c)(1),
(2), (4) Date: Dec. 31, 2012

(87) PCT Pub. No.: WO2012/001300
PCT Pub. Date: Jan. 5, 2012

(65) Prior Publication Data
US 2013/0098903 A1 Apr. 25, 2013

(30) Foreign Application Priority Data
Jun. 30, 2010 (FR) ...................... 10 02747

(51) Int. Cl.
*H05B 6/12* (2006.01)
*C03C 4/02* (2006.01)
(Continued)

(52) U.S. Cl.
CPC ............ *H05B 6/1218* (2013.01); *C03C 4/02* (2013.01); *C03C 10/0027* (2013.01); *C03C 17/00* (2013.01); *F24C 15/10* (2013.01)

(58) Field of Classification Search
CPC ...... H05B 6/1218; H05B 6/1209; H05B 3/68; C03C 4/02; F24C 15/102; A47J 31/053; A47J 36/20; B32B 17/10036
(Continued)

(56) References Cited

U.S. PATENT DOCUMENTS

| 7,473,660 B2 * | 1/2009 | Comte ................ C03C 10/0027 |
| | | 501/4 |
| 7,671,303 B2 * | 3/2010 | Vilato .................... C03C 17/04 |
| | | 219/443.1 |

(Continued)

FOREIGN PATENT DOCUMENTS

| EP | 1 170 264 | 1/2002 |
| EP | 1 465 460 | 10/2004 |

(Continued)

OTHER PUBLICATIONS

International Search Report dated Aug. 30, 2011 in PCT/FR11/51511 Filed Jun. 29, 2011.

*Primary Examiner* — Ibrahime A Abraham
*Assistant Examiner* — John J Norton
(74) *Attorney, Agent, or Firm* — Oblon, McClelland, Maier & Neustadt, L.L.P.

(57) ABSTRACT

One subject of the invention is a cooking device comprising internal elements including at least one heating means, control and/or monitoring means and at least one light-emitting device, said internal elements being covered with at least one glass or glass-ceramic plate colored using vanadium oxide, at least one light-emitting device not being of red color seen through said plate, said plate intrinsically having a light transmission ranging from 2.3% to 40% and an optical transmission of at least 0.6% for at least one wavelength within the region ranging from 420 to 480 nm, said cooking device being such that at least one masking (Continued)

means intended to mask at least one part of said internal elements is placed on top of, underneath or within said plate.

24 Claims, 1 Drawing Sheet

(51) Int. Cl.
    *C03C 17/00*     (2006.01)
    *F24C 15/10*     (2006.01)
    *C03C 10/00*     (2006.01)

(58) Field of Classification Search
    USPC ........... 219/622, 452.12, 452.11, 441, 443.1; 428/426; 99/403
    See application file for complete search history.

(56) References Cited

U.S. PATENT DOCUMENTS

| | | | |
|---|---|---|---|
| 8,198,201 B2 * | 6/2012 | Comte | C03C 3/085 501/4 |
| 2002/0026932 A1 | 3/2002 | Mitra et al. | |
| 2003/0087106 A1 * | 5/2003 | De Witzmann | C03C 8/14 428/432 |
| 2003/0218001 A1 * | 11/2003 | Siebers | C03C 4/02 219/452.11 |
| 2005/0172829 A1 * | 8/2005 | Shimatani | C03C 17/06 99/403 |
| 2005/0224491 A1 * | 10/2005 | Vilato | C03C 17/04 219/443.1 |
| 2007/0004578 A1 * | 1/2007 | Monique Comte | C03C 1/004 501/4 |
| 2007/0108184 A1 * | 5/2007 | Imamoto | H05B 6/1218 219/441 |
| 2007/0129231 A1 | 6/2007 | Comte | |
| 2007/0295711 A1 | 12/2007 | Striegler et al. | |
| 2010/0020534 A1 * | 1/2010 | Isoda | F24C 7/086 362/97.1 |
| 2010/0089905 A1 * | 4/2010 | Nelson | H05B 3/74 219/452.11 |
| 2010/0304948 A1 * | 12/2010 | Comte | C03C 3/085 501/32 |
| 2012/0085336 A1 * | 4/2012 | Brunet | C03C 3/087 126/211 |

FOREIGN PATENT DOCUMENTS

| | | | | |
|---|---|---|---|---|
| EP | 1 867 613 | 12/2007 | | |
| FR | 2 868 066 | 9/2005 | | |
| FR | 2 902 420 A1 | 12/2007 | | |
| FR | 2 902 421 | 12/2007 | | |
| JP | 2006 125645 | 5/2006 | | |
| JP | 2006-125645 A | 5/2006 | | |
| JP | WO 2009075141 A1 * | 6/2009 | ............. | F24C 15/10 |
| WO | WO 2010040443 A2 * | 4/2010 | ............. | C03C 3/087 |
| WO | 2010 136731 | 12/2010 | | |
| WO | 2010 137000 | 12/2010 | | |

* cited by examiner

LIGHT-TRANSMITTING PLATE

The invention relates to the field of cooking devices.

It relates more particularly to cooking devices comprising internal elements including at least one heating means, control and/or monitoring means and at least one light-emitting device, said internal elements being covered with at least one glass or glass-ceramic plate colored using vanadium oxide.

These cooking devices, sometimes referred to as "cooktops", are especially valued for their esthetic qualities. These devices are often fitted into a worktop or mounted on a cooker, so that the only element visible to the user is the glass or glass-ceramic plate. This plate conceals the rest of the device, including the internal elements: heating means, for example induction heating means (inductors) or radiant heating means (halogen or radiant heating elements), electric wiring, electronic boards intended for managing the control, monitoring or display means, housing (generally made of sheet metal), thermal insulators, display devices, mechanical fastening means, thermal limiters, etc. Among these internal elements, most should be masked by the plate, whereas some should be visible when they are in an operating state. This is especially the case for the radiant heating means, which, when turned on, emit a visible radiation which must, for safety reasons, be perceived by the user. This is also the case for the display devices that emit light (for example based on light-emitting diodes), which should not be visible as such, but the light emitted from which should be able to be seen by the user. These devices are specifically intended to provide the user with a whole series of useful information: power levels of the heating means, identification of the zones of the plate exceeding a given temperature level, etc.

To solve this problem, solutions have been provided that consist in using plates made of glass or glass-ceramic that is colored using vanadium oxide, usually made of the latter material, which conceal the internal elements by absorbing most of the visible radiation. These plates, which are very dark, have a very low light transmission (integrated across the entire visible spectrum), of the order of one percent, but have a higher transmission in the red, so much so that the red light emitted by the radiant or halogen heating elements is visible to the user when they are operating. Similarly, these plates make it possible to perceive information conveyed by light-emitting diodes that emit in the red.

Such plates block, however, almost all of the radiation associated with the other colors: the light emitted by blue light-emitting diodes is in particular completely invisible or barely perceptible through such plates.

Application WO 2010/040443 proposes, in order to solve the latter problem, a plate for which the transmission integrated in the visible region (light transmission) is at most 2.5%, but for which the optical transmission at 450 nm and above is at least 0.1%. Transmissions ranging from 0.1 to 0.38% for a wavelength of 450 nm are thus described.

This solution is not however without drawbacks, since at this low level of transmission at 450 nm, the blue light will only be clearly perceived if the light intensity of the device emitting the light is high, which, for example in the case of light-emitting diodes, necessitates using high electric powers, especially by means of increasing the intensity of the supply current. The necessary power adaptation then leads to a modification of the control circuits of the cooking devices. The low luminosities also lead to a greater sensitivity to the luminous environment: in the case of considerable external lighting, the blue light-emitting diodes are not sufficiently visible to the user.

Application EP-A-1 465 460 itself proposes glass-ceramics for which the light transmission Y, integrated over the entire visible spectrum, is greater than or equal to 2.5%, and may range up to 15%, for a thickness of 3 mm. Acting on the sole transmission integrated is however insufficient: for the lowest transmissions, the blue light is only adequately perceived if the light intensity of the light-emitting device is high, whereas the highest transmissions lead to too great a visibility of the internal elements of the cooking device.

The objective of the invention is to solve these various problems. For this purpose, one subject of the invention is a cooking device comprising internal elements including at least one heating means, control and/or monitoring means and at least one light-emitting device, said internal elements being covered with at least one glass or glass-ceramic plate colored using vanadium oxide, at least one light-emitting device not being of red color seen through said plate, said plate intrinsically having a light transmission ranging from 2.3% to 40% and an optical transmission of at least 0.6% for at least one wavelength within the region ranging from 420 to 480 nm, said cooking device being such that at least one masking means intended to mask at least one part of said internal elements is placed on top of, underneath or within said plate.

Figure 1:
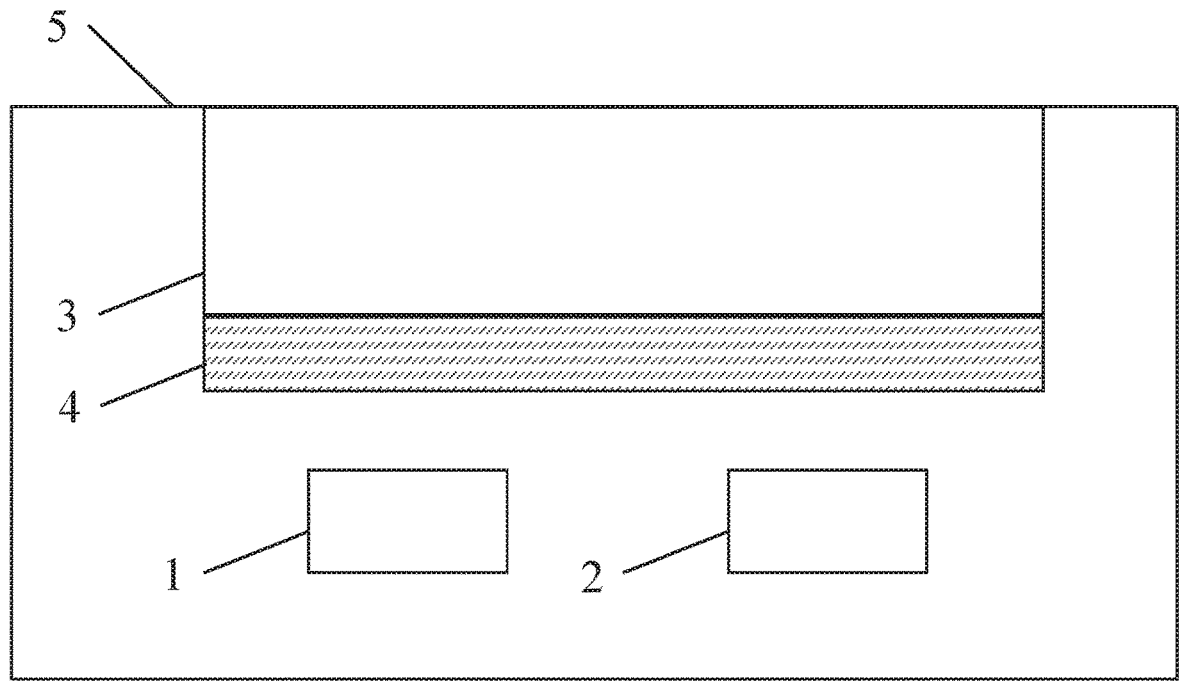
FIG. 1: A cooking device 5 that includes: a first internal element 1; a second internal element 2; a glass or glass-ceramic plate 3 colored with vanadium oxide covering the first internal element 1 and the second internal element 2; and a masking element 4 underneath the plate 3 that is made of a light radiation scattering material and/or light radiation absorbing material and masks a part of the first internal element 1 and the second internal element 2.
Figure 2:
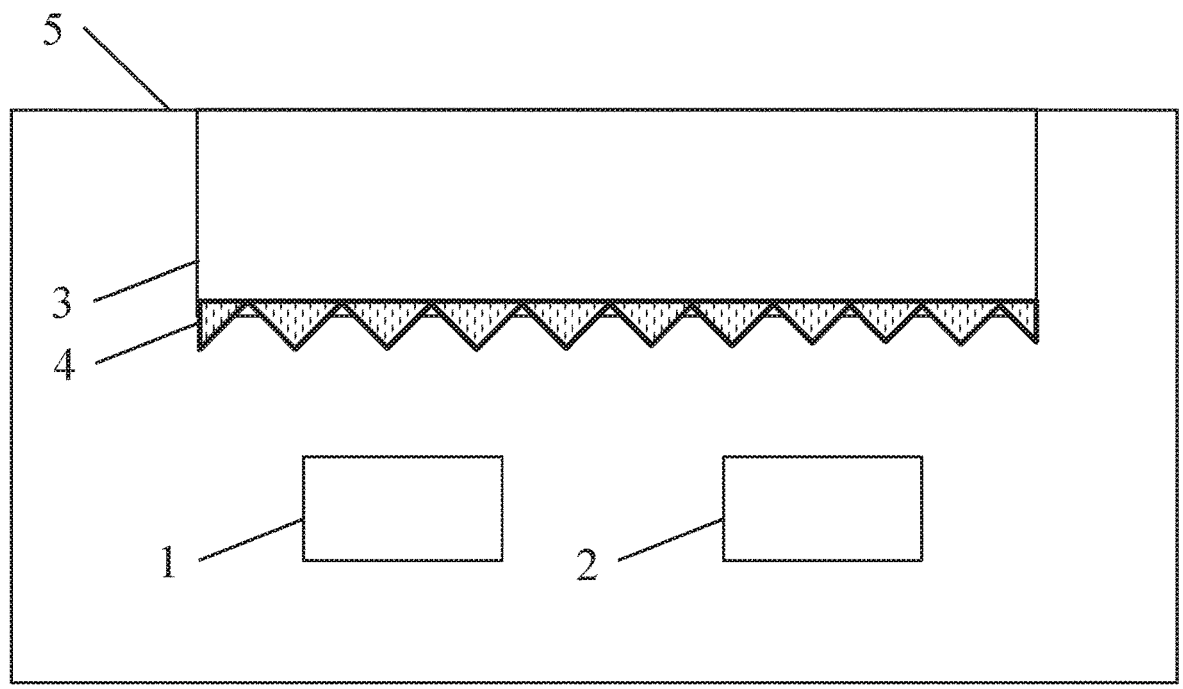
FIG. 2: A cooking device 5 that includes: a first internal element 1; a second internal element 2; a glass or glass-ceramic plate 3 colored with vanadium oxide covering the first internal element 1 and the second internal element 2; and a masking element 4 that is formed by heterogeneities on a lower surface of the plate 3 and masks a part of the first internal element 1 and the second internal element 2.

The expression "said plate intrinsically having a light transmission ranging from 2.3% to 40%" is understood to mean that the plate has such a light transmission by itself, without the presence of any coating. The light transmission is as defined by the ISO 9050:2003 standard.

The term "transmission" is understood to mean the total transmission, taking into account both the direct transmission and the optional diffuse transmission. In order to measure it, use is therefore preferably made of a spectrophotometer equipped with an integrating sphere. In the case of a glass-ceramic plate having periodic reliefs (especially studs) on at least one face, the thickness of the plate takes into account these reliefs.

A, the or each heating means is preferably chosen from induction heating means and radiant heating means. They may be, by way of example, inductors, radiant heating elements or halogen heating elements. It is possible to combine various heating means within one and the same cooking device.

A, the or each light-emitting device is advantageously chosen from light-emitting diodes (for example belonging to 7-segment displays), liquid crystal displays (LCDs), optionally organic, light-emitting diode (OLED) displays, and fluorescent displays (VFDs). The colors seen through the plate are diverse: red, green, blue and all the possible combinations, including yellow, violet, white, etc. These light-emitting devices may be purely decorative, for example to visually separate various zones of the plate. Most often however they will have a functional role displaying various information useful for the user, especially indication of the heating power, of the temperature, of cooking programs, of cooking time, of zones of the plate exceeding a predetermined temperature.

The control and monitoring devices generally comprise touch-sensitive keys, for example of the capacitive or infrared type.

All of the internal elements are generally attached to a housing, often metallic, which therefore constitutes the lower part of the cooking device, normally concealed in the worktop or in the body of the cooker. This housing belongs to the internal elements within the meaning of the present invention, in the sense that it may be visible, especially by reflection when the cooking device is illuminated, for example by means of luminous devices located in the extraction hood.

Preferably, the masking means is a coating deposited on and/or under the plate, said coating having the ability to absorb and/or reflect and/or scatter the light radiation, or the masking means, positioned under the plate and which may or may not be firmly attached to said plate, is constituted of a material having the ability to absorb and/or scatter light radiation, or the masking means is constituted by heterogeneities located within the plate or on the lower surface thereof, especially texturings, said heterogeneities being capable of deforming the images by light radiation scattering or refraction phenomena. The simple bulk coloring of the plate (especially due to the presence of vanadium) cannot constitute a masking means within the meaning of the present invention.

Advantageously, the masking means are capable of masking at least 50%, or even 70% and even 80%, 90% or 95% of the surface occupied by the internal elements. In the case of induction heating means, the masking means are preferably capable of masking almost all of the internal elements, with the exception of the light-emitting devices. In the case of radiant heating means, the masking means are preferably capable of masking almost all of the internal elements, with the exception of the light-emitting devices and the heating elements.

Preferably, the plate intrinsically has a light transmission ranging from 2.5% or 3% to 25%, especially of at most 10% and even 8%, or else 7% or 5%, or even 4%. A light transmission ranging from 3 to 4% is particularly preferred. This is because high light transmissions increase the risk of discerning the internal elements of the cooking device. In particular, in the case of the highest transmissions, for example of at least 5 or 10%, the plate is advantageously provided within it or on its lower surface with heterogeneities that are capable of deforming the images by light radiation scattering or reflection phenomena. The expression "lower surface" is understood to mean the surface of the plate facing toward the internal elements of the device. It may, by way of example, be texturings, described in greater detail in the remainder of the present text.

Preferably, the plate intrinsically has an optical transmission of at least 0.7%, 0.8%, in particular 0.9%, or even 1% for at least one wavelength within the region ranging from 420 to 480 nm, preferably for any wavelength within this region, or within the region ranging from 450 to 480 nm. Indeed, it has been observed that too low a transmission in this range of wavelengths disturbed the viewing of blue light, making it necessary to substantially modify the control circuit of the light-emitting diodes relative to the control circuits customarily used in the case of red light-emitting diodes. The invention makes it possible to simply adjust the design of the circuit by means of a minor adjustment of the supply voltage or of the supply current of the diodes.

The plate preferably has a thickness ranging from 2 to 6 mm, especially of the order of 3 or 4 mm. Excessively small thicknesses do not make it possible to obtain a sufficient mechanical strength whereas large thicknesses lead to a needless rise in price of the plate through the use of more material.

According to a first embodiment, the plate is made of glass, especially of borosilicate, aluminoborosilicate or soda-lime-silicate type, said plate optionally being tempered, especially when the glass is of soda-lime-silicate type. This type of plate may be used in combination with gas heating means.

The targeted transmissions are obtained by addition of colorants, especially chosen from iron oxides, chromium oxides, nickel oxides, cobalt oxides, copper oxides or from elements such as sulfur or selenium.

According to a second, more preferred embodiment, the plate is made of glass-ceramic, especially of the lithium aluminosilicate type. This type of glass-ceramic is specifically capable of withstanding large thermal shocks, owing to a very low, or even zero, thermal expansion coefficient.

Conventionally, a glass-ceramic is produced in several steps: a) melting of the glass batch materials containing at least one nucleating agent; b) forming and cooling of the glass—called "mother glass"—at a temperature lower than its conversion range; and c) heat treatment to ceramize the glass.

This "ceramization" heat treatment makes it possible to grow within the glass crystals of β-quartz or β-spodumene structure (depending on the ceramization temperature), which have the particular feature of having negative thermal expansion coefficients.

The presence, in the final glass-ceramic, of such crystals and of a residual glassy phase, makes it possible to obtain a zero or very low overall thermal expansion coefficient (the absolute value of the expansion coefficient is typically less than or equal to $15 \times 10^{-7}/°C.$, or even $5 \times 10^{-7}/°C.$). The size of crystals of β-quartz structure is generally very small so as not to scatter visible light. For this reason, the predominant, in particular sole, crystalline form is preferably of β-quartz structure.

Preferably, the chemical composition of the plate comprises the following constituents in the limits defined below expressed as percentages by weight:

| | |
|---|---|
| $SiO_2$ | 52-75% |
| $Al_2O_3$ | 18-27% |
| $Li_2O$ | 2.5-5.5% |
| $K_2O$ | 0-3% |
| $Na_2O$ | 0-3% |
| ZnO | 0-3.5% |
| MgO | 0-3% |
| CaO | 0-2.5% |
| BaO | 0-3.5% |

-continued

| | |
|---|---|
| SrO | 0-2% |
| $TiO_2$ | 1.2-5.5% |
| $ZrO_2$ | 0-3% |
| $P_2O_5$ | 0-8%. |

This glass-ceramic may comprise up to 1% by weight of non-essential constituents which do not adversely affect the melting of the mother glass or the subsequent devitrification resulting in the glass-ceramic.

Preferably, the chemical composition of the plate comprises the following consituents in the limits defined below expressed as percentages by weight:

| | |
|---|---|
| $SiO_2$ | 64-70% |
| $Al_2O_3$ | 18-21% |
| $Li_2O$ | 2.5-3.9% |
| $K_2O$ | 0-<1.0% |
| $Na_2O$ | 0-<1.0% |
| ZnO | 1.2-2.8% |
| MgO | 0.2-1.5% |
| CaO | 0-1% |
| BaO | 0-3% |
| SrO | 0-1.4% |
| $TiO_2$ | 1.8-3.2% |
| $ZrO_2$ | 1.0-2.5%. |

The barium oxide content is preferably between 1 and 3%, especially between 2 and 3%, so as to reduce the viscosity of the glass. For the same reason, the silica content is preferably less than or equal to 68%, especially 67% or even 66%. The inventors have also been able to demonstrate that there is a very pronounced effect of the lime (CaO) content on the reduction in viscosity, even for very small amounts added. For this reason, the CaO content is at least 0.2%, especially 0.3% and even 0.4%.

The best results are obtained for alumina ($Al_2O_3$) contents that are less than or equal to 19.5%, especially 19%.

The glass-ceramic is colored using vanadium oxide. Vanadium oxide is added to the batch materials of the mother glass before the melting operation, and it gives, after ceramization, a very pronounced brown-orange tint, due to a reduction of the vanadium during the ceramization process. This colorant makes it possible to tint the glass-ceramic and to obtain the targeted light transmission, while only weakly absorbing infrared radiation. The weight content of vanadium oxide, expressed in the form $V_2O_5$, preferably varies from 0.01 to 0.2%, especially from 0.01 to 0.1%, and even from 0.01 to 0.06% or from 0.01 to 0.04%.

Other coloring oxides are advantageously added, in combination with the vanadium oxide. These are especially iron oxide ($Fe_2O_3$), the weight content of which preferably varies from 0.02 to 0.2%, especially between 0.03 and 0.1% and/or cobalt oxide (CoO), the weight content of which preferably varies from 0.01 to 0.12%, especially from 0.01 to 0.07%. The presence of cobalt oxide advantageously makes it possible to independently control the light transmission and the transmission in the wavelength regions corresponding to the blue or green regions.

On the other hand, it is preferable to exclude, as far as possible, colorants such as chromium oxide ($Cr_2O_3$) or nickel oxide (NiO). Their weight content is preferably less than or equal to 200 ppm, or even 100 ppm and even 10 or else 5 ppm.

So that the vanadium oxide can fully perform its coloring role, it is preferable to add an agent capable of reducing the vanadium during the ceramization. This may especially be arsenic oxide ($As_2O_3$), antimony oxide ($Sb_2O_3$), tin oxide ($SnO_2$) or a metal sulfide. Preferably, the arsenic and antimony oxides are however excluded, except for inevitable traces, for environmental reasons and because these oxides have proved to be incompatible with a float-type forming process, in which molten glass is poured onto a bath of molten tin. These various agents are also refining agents, which make it possible to discharge the gaseous inclusions from the bath of molten glass.

The tin oxide content is preferably less than or equal to 0.5%, in particular between 0.1 and 0.3%.

The metal sulfide is preferably chosen from transition metal sulfides, for example zinc sulfide, alkali metal sulfides, for example potassium sulfide, sodium sulfide and lithium sulfide, alkaline-earth metal sulfides, for example calcium sulfide, barium sulfide, magnesium sulfide and strontium sulfide. The preferred sulfides are zinc sulfide, lithium sulfide, barium sulfide, magnesium sulfide and strontium sulfide. Zinc sulfide has proved to be particularly advantageous since it does not contribute to coloring the glass or the glass-ceramic. It is also favored when the glass-ceramic must contain zinc oxide: in this case the zinc sulfide plays a double role of reducing agent/refining agent and of source of zinc oxide.

The sulfide may also be introduced into the glass batch materials in the form of a slag or a sulfide-enriched glass frit, which have the advantage of accelerating the digestion of stones, and improving both the chemical homogeneity and the optical quality of the glass. However, it is well known that slags also contain iron in a substantial amount, which reduces the infrared transmission. From this standpoint, it is preferable to use glass frits whose chemical composition, especially the iron content, may be perfectly controlled.

Preferably, the sulfide is added to the glass batch materials in an amount of less than 2%, advantageously less than 1% and better still between 0.07 and 0.8% of the total weight of the glass batch materials. Contents between 0.3 and 0.7% are preferred.

To fully perform its refining role, the sulfide, especially zinc sulfide, is preferably combined with a reducing agent such as coke. The coke content introduced is preferably between 800 and 2000 ppm, in particular between 1200 and 1800 ppm (1 ppm=0.0001% by weight).

The sulfide may also be combined with an oxidizing agent, preferably a sulfate. Sulfates have the advantage of not forming coloring species in the glass or the glass-ceramic. The sulfate may especially be a sodium, lithium or else magnesium sulfate. The sulfate contents introduced are preferably between 0.2 and 1% by weight, in particular between 0.4 and 0.8%, expressed as $SO_3$.

The process for obtaining the plate according to the invention comprises a step of melting and refining a glass (mother glass), then, in the case of a glass-ceramic plate, a ceramization step.

The melting is preferably carried out in a glass-melting furnace, with the aid of at least one burner. Batch materials (silica, spodumene, etc.) are introduced into the furnace and undergo, under the effect of the high temperatures, various chemical reactions, such as reactions of decarbonation, of melting itself, etc.

The refining step corresponds to the removal of gaseous inclusions trapped within the mass of molten glass. The refining is generally carried out at a temperature at least equal to the melting temperature, by virtue of the generation of bubbles which will entrain the undesirable inclusions to the surface of the mass of molten glass. The melting and refining of the glass (mother glass) are preferably carried out at temperatures less than or equal to 1700° C., in particular 1650° C. and even 1600° C.

After the refining step, the glass (mother glass) obtained is treated under customary conditions for producing a glass-ceramic or glass.

Thus, the glass may be formed, for example in the form of a ribbon under the conditions of the float process, in which the molten glass floats on a bath of molten tin, and then said ribbon is cut into plates, or directly in plate form by rolling, or else molded to the desired shape.

If necessary, the formed glass then undergoes a heat treatment for the purpose of converting it to a glass-ceramic.

During the ceramization step, the mother glass may in particular undergo a ceramization cycle comprising the following steps:
a) raising the temperature to the nucleation range, generally located close to the conversion range, especially at 50-80° C. per minute;
b) passing through the nucleation range (650-850° C.) in 15 to 60 minutes;
c) raising the temperature to the ceramization hold temperature T of between 900 and 1000° C. in 5 to 30 minutes;
d) maintaining the ceramization hold temperature T for a time t of 5 to 25 minutes; and
e) rapid cooling down to ambient temperature.

The process for manufacturing the plate generally comprises a cutting operation, for example by mechanical scoring with a scoring roll, waterjet or laser, generally followed by an operation for fashioning the edges (grinding, optionally beveling).

According to a first preferred embodiment, the masking means is a coating deposited on and/or under the plate, said coating having the ability to absorb and/or reflect and/or scatter the light radiation. The coating is preferably deposited underneath the plate, that is to say on the surface facing the internal elements of the device, also known as the "lower surface".

In the case where the heating means are induction heating means, it is preferable to position the coating over almost the entire surface of the plate, with the exception of the zones located opposite the light-emitting devices. In the case of radiant heating means, it is preferable to position the coating over almost the entire surface of the plate, with the exception of the zones located opposite the light-emitting devices and heating elements. In this way, the radiant or halogen heating elements are always visible when turned on.

The coating may be continuous or discontinuous, for example having patterns, or a mesh or spotted or speckled screen. In certain cases, the coating may be continuous in certain zones, and discontinuous in other zones. Thus, it is possible to have a discontinuous coating at the heating elements and a continuous coating elsewhere, while reserving an uncoated zone opposite the light-emitting devices. The light transmission of the plate equipped with its coating, in the coated zones, is preferably at most 0.5% and even 0.2%. The coating may be completely opaque.

The zone opposite the light-emitting devices may also be provided with a coating, on condition that this coating is not opaque.

Advantageously, the plate also comprises a decoration on the upper face, generally made of enamel, the role of which is decorative, and which is not intended to mask the internal elements of the cooking device, insofar as the surface area covered by this enamel is very small. The decoration generally makes it possible to identify the heating zones (for example by representing them in the form of a circle), the control zones (especially the touch-sensitive controls), and the zones for providing information or representing a logo. This decoration should be differentiated from the coating according to the invention, which constitutes a real masking means.

Preferably, the coating may be an organic-based layer, such as a layer of paint or of lacquer, or a mineral-based layer, such as an enamel or a metallic or metal oxide, nitride, oxynitride or oxycarbide layer.

The paint which may be used is advantageously chosen so as to withstand high temperatures and to exhibit stability, over time, with respect to its color and its cohesion with the plate, and so as not to adversely affect the mechanical properties of the plate.

The paint used advantageously has a degradation temperature of greater than 350° C., in particular between 350° C. and 700° C. It is generally based on resin(s), where appropriate filled (for example with pigment(s) or dye(s)), and is optionally diluted in order to adjust its viscosity for the purpose of applying it to the glass-ceramic, the diluent or solvent (for example white spirit, toluene, solvents of aromatic hydrocarbon type, such as the solvent sold under the trademark Solvesso 100® by Exxon, etc.) being, where appropriate, removed during the final baking of the paint.

For example, the paint may be a paint based on at least one silicone resin, in particular a silicone resin modified by the incorporation of at least one radical such as an alkyd or phenyl or methyl radical, etc. It is also possible to add pigments and also dyes, such as pigments for enamels (chosen for example from components containing metal oxides, such as chromium oxides, copper oxides, iron oxides, cobalt oxides, nickel oxides, or from copper chromates, cobalt chromates, etc.), $TiO_2$, etc. It is also possible to use, as pigments, particles of one or more metals such as aluminum, copper, iron, etc., or alloys based on at least one of these metals. The pigments may also be "effect pigments" (pigments having a metallic effect, interference pigments, pearlescent pigments, etc.), advantageously in the form of aluminum oxide ($Al_2O_3$) flakes coated with metal oxides; mention may be made, for example, of the pigments sold by Merck under the trademark Xirallic®, such as $TiO_2/Al_2O_3$ pigments or interference pigments (Xirallic® T-50-10SW Crystal Silver or Xirallic® T-60-23SW Galaxy Blue or Xirallic® T-60-24SW Stellar Green), or $Fe_2O_3/Al_2O_3$ pigments (Xirallic® T-60-50SW Fireside Copper or Xirallic® F-60-51 Radiant Red). Other effect pigments that may be used are, for example, pearlescent pigments based on mica particles coated with oxides or a combination of oxides (chosen, for example, from $TiO_2$, $Fe_2O_3$, $Cr_2O_3$, etc.), such as those sold under the trademark Iriodin® by Merck, or based on silica platelets coated with oxides or a combination of oxides (like those above), such as those sold under the trademark Colorstream® by Merck. Fillers or other pigments of conventional coloration may also be incorporated with the aforementioned effect pigments.

Particularly preferably, the paint used comprises at least (or is based on) a high-temperature-resistant (co)polymer (in particular that has a degradation temperature above 400° C.), it being possible or not for this paint to contain at least one mineral filler in order to ensure its cohesion or its mechanical rein-forcement and/or its coloration. This (co)polymer or resin may especially be one or more of the following resins: polyimide, polyamide, polyfluorinated, poly-silsesquioxane and/or polysiloxane resin.

Polysiloxane resins are particularly preferred: they are colorless, and therefore capable of being colored (for example with fillers or pigments that give them the desired color); they may be used in the crosslinkable state (generally due to the presence of SiOH and/or SiOMe groups in their formula, these groups usually reaching up to 1 to 6% by weight of their total weight), or converted (crosslinked or pyrolyzed).

Advantageously, they have within their formula phenyl, ethyl, propyl and/or vinyl units, very advantageously phenyl and/or methyl units. They are preferably chosen from polydimethylsiloxanes, polydiphenylsiloxanes, phenylmethylsiloxane polymers and dimethylsiloxane/diphenylsiloxane copolymers.

The crosslinkable polysiloxane resins preferably used generally have a weight-average molecular weight (Mw) between 2000 and 300 000 Daltons.

It may be indicated, nonlimitingly, that Dow Corning® 804, 805, 806, 808, 840, 249, 409 HS and 418 HS resins, Rhodorsil® 6405 and 6406 resins from Rhodia, Triplus® resins from General Electric Silicone and Silres® 604 resins from Wacker Chemie GmbH, used alone or as a mixture, are perfectly suitable.

The resins thus chosen are especially capable of withstanding induction heating and may also be suitable (in particular the above polysiloxane resins) for other types of heating (gas burner, or even radiant or halogen heating).

The paint may be free of mineral fillers, especially if its thickness remains small. However, such mineral fillers are generally used, for example to mechanically strengthen the layer of paint deposited, to contribute to the cohesion of said layer and to its attachment to the plate, to combat the appearance and propagation of cracks within it, etc. For such purposes, at least one fraction of said mineral fillers preferably has a lamellar structure. The fillers may also be used for the coloring. Where appropriate, several types of complementary fillers may be used (for example uncolored fillers for mechanical reinforcement and other fillers such as pigments for coloring). The effective amount of mineral fillers generally corresponds to a volume content of 10 to 60%, more particularly of 15 to 30% (volume contents based on the total volume of the fillers and of the paint).

The thickness of each paint layer deposited may be between 1 and 100 microns, in particular between 5 and 50 microns. The paint or resin may be applied by any suitable technique, such as brush deposition, doctor blade deposition, sputtering, electrostatic deposition, dip-coating, curtain coating, screen printing, inkjet printing, etc. and preferably takes place by screen printing (or optionally doctor blade deposition). The screen-printing technique is particularly advantageous in that it readily makes it possible to reserve certain zones of the plate, especially the zones which will be facing the light-emitting devices, or even the zones located opposite the radiant heating means. When other techniques are used, the reserved areas may be obtained by placing suitable masks over the zones that are not desired to be covered.

The deposition may be followed by a heat treatment intended to provide, as the case may be, the drying, crosslinking, pyrolysis, etc. of the deposited layer(s).

Preferably, at least one layer of paint is chosen in which the resin has been, at least in part, crosslinked and/or pyrolyzed, partially or completely, and/or has not been heat treated (the resin may optionally be intended to be removed from the places where it has not been heat treated), said layer of paint consisting, in part or completely, of a mixture a) of mineral fillers and b) of at least one crosslinkable polysiloxane resin (almost) free of precursor(s) of carbon-based material(s) and/or of at least one crosslinked poly-siloxane resin (almost) free of carbon-based material(s) and of precursor(s) of carbon-based material(s) and/or of a porous mineral matrix based on silica (the resin having, for example, been pyrolyzed and therefore being mineralized), (almost) free of carbon-based material(s), the mineral fillers being distributed in the resin or the matrix.

As indicated previously, the coating may also be an enamel. The enamel is formed from a powder comprising a glass frit and pigments (these pigments possibly also being part of the frit), and from a medium for the application to the substrate.

The glass frit is preferably obtained from a vitrifiable blend comprising, generally, oxides chosen in particular from silicon oxide, zinc oxide, sodium oxide, boron oxide, lithium oxide, potassium oxide, calcium oxide, aluminum oxide, magnesium oxide, barium oxide, strontium oxide, antimony oxide, titanium oxide, zirconium oxide and bismuth oxide. Glass frits that are particularly suitable in the case of glass-ceramics are described in applications FR 2782318 or WO 2009/092974.

The pigments may be chosen from the compounds containing metal oxides such as chromium oxide, copper oxide, iron oxide, cobalt oxide, nickel oxide, etc., or may be chosen from copper chromate or cobalt chromate, etc., the content of pigment(s) in the frit(s)/pigment(s) assembly being, for example, between 30 and 60% by weight.

The pigments may also be "effect pigments" (pigments having a metallic effect, interference pigments, pearlescent pigments, etc.), such as those cited previously in relation to a paint. The content of effect pigments may be, for example, of the order of 30 to 60% by weight relative to the base (glass frit) into which they are incorporated.

The layer may especially be deposited by screen printing (the base and the pigments being, where appropriate, put into suspension in a suitable medium generally intended to be consumed in a subsequent baking step, it being possible for this medium, in particular, to comprise solvents, diluents, oils, resins, etc.), the thickness of the layer being, for example, of the order of 1 to 6 μm.

The screen-printing technique is particularly advantageous in that it readily makes it possible to reserve certain zones of the plate, especially the zones which will be opposite the light-emitting devices, or even the zones located opposite the radiant heating means.

In the case of plates made of glass-ceramic, the deposition of the enamel layer is preferably carried out before the ceramization step, which then serves to bake the enamel.

The or each enamel layer used to form the coating is preferably a single layer, separated from other optional enamel layer(s), and having a thickness that does not generally exceed 6 μm, preferably that does not exceed 3 μm. The enamel layer is generally deposited by screen printing.

The coating may also be a metallic layer or a metal oxide, nitride, oxynitride or oxycarbide layer. The term "layer" should also be understood to include multilayers of layers. This layer may be absorbent and/or reflective.

This layer may therefore be, for example, at least one single metallic or mainly metallic layer (for example a thin layer of Ag, W, Ta, Mo, Ti, Al, Cr, Ni, Zn, Fe, or of an alloy based on several of these metals, or a thin layer based on stainless steels, etc.), or may be a multilayer of (sub)layers comprising one or more metallic layers, for example a metallic (or mainly metallic) layer advantageously protected (coated on at least one face and preferably on its two opposite faces) by at least one layer based on a dielectric material (for example, at least one layer made from silver or aluminum coated with at least one $Si_3N_4$ protective layer—in particular an $Si_3N_4$/metal/$Si_3N_4$ multilayer—or an $SiO_2$ protective layer).

It may alternatively be a single-layer coating based on a dielectric material having a high refractive index n, that is to say greater than 1.8, preferably greater than 1.95, and particularly preferably greater than 2, for example a single layer of $TiO_2$, or of $Si_3N_4$, or of $SnO_2$, etc.

In another advantageous embodiment, the layer may be formed from a multilayer of thin (sub)layers based on dielectric material(s) alternately having high (preferably greater than 1.8, or even 1.95, or even 2, as explained previously) and low (preferably less than 1.65) refractive indices, especially material(s) of the following types: metal oxide (or metal nitride or oxynitride), such as $TiO_2$, $SiO_2$ or mixed oxide (tin-zinc, zinc-titanium, silicon-titanium, etc.) or alloy, etc.; the (sub)layer that is deposited first, where appropriate, and that is therefore against the inner face of the plate, advantageously being a layer of high refractive index.

As the (sub)layer material having a high refractive index, mention may be made, for example, of $TiO_2$ or optionally $SnO_2$, $Si_3N_4$, $Sn_xZn_yO_z$, $TiZnO_x$ or $Si_xTi_yO_z$, ZnO, $ZrO_2$, $Nb_2O_5$, etc. As the (sub)layer material having a low refractive index, mention may be made, for example, of $SiO_2$, or optionally a silicon oxynitride and/or oxycarbide, or a mixed oxide of silicon and aluminum, or a fluoro compound, for example of the $MgF_2$ or $AlF_3$ type, etc.

The multilayer may comprise, for example, at least three (sub)layers, the layer closest to the substrate being a layer of high refractive index, the intermediate layer being a layer of low refractive index and the outer layer being a layer of high refractive index (for example, a multilayer comprising the following alternation of oxide layers: (substrate)—$TiO_2$/$SiO_2$/$TiO_2$).

The (geometric) thickness of each layer based on thin layer(s) deposited is generally between 15 and 1000 nm, in particular 20 and 1000 nm (the thickness of the substrate generally being a few millimeters, most often around 4 mm), and the thickness of each of the (sub)layers (in the case of a multilayer) may vary between 5 and 160 nm, generally between 20 and 150 nm (for example in the case of the $TiO_2$/$SiO_2$/$TiO_2$ multilayer, it may be around a few tens of nanometers, for example around 60-80 nm, for the $TiO_2$ layers and around 60-80 or 130-150 nm for the $SiO_2$ layer depending on the appearance, for example more silvery or more golden, that it is desired to obtain).

The layer based on one or more thin layers may be applied to the plate, generally after ceramization, in line or in a subsequent step (for example after the cutting and/or shaping of said plate). It may especially be applied by (powder, liquid or gaseous) pyrolysis, by evaporation or by sputtering. Preferably, it is deposited by sputtering and/or by a vacuum and/or plasma-enhanced deposition method; in particular, the method of depositing the layer(s) by sputtering (for example, by magnetron sputtering), especially enhanced by a magnetic field (and in DC or AC mode) is used, the oxides or nitrides being deposited from one or more suitable metal or alloy or silicon or ceramic, etc., targets, if necessary under oxidizing or nitriding conditions (argon/oxygen or argon/nitrogen mixtures where appropriate). It is also possible to deposit, for example, oxide layers by reactive sputtering of the metal in question in the presence of oxygen and the nitride layers in the presence of nitrogen. To make the $SiO_2$ or $Si_3N_4$ it is possible to start from a silicon target that is lightly doped with a metal such as aluminum to make it sufficiently conductive. The (sub)layer(s) chosen according to the invention condense on the substrate in a particularly homogeneous manner, without separation or delamination occurring.

According to a second preferred embodiment, the masking means, positioned underneath the plate and firmly attached or not to said plate, is constituted of a material having the ability to absorb and/or scatter light radiation.

By way of examples, it may be an absorbent fabric (for example of black color), a plastic foil, a metal foil or sheet, for example painted a dark color. The fabric may especially be based on glass fibers.

These foils or other sheets may, for example, be adhesively bonded or fastened by other means to the lower surface of the glass or glass-ceramic plate, or fastened at a certain non-zero distance from the latter, but above the internal elements that it is desired to mask. Reserved areas are left on these foils or sheets in the zones that are not desired to be masked, especially the zones located opposite the light-emitting devices.

The absorbent or scattering material positioned underneath the plate can mask all of the internal elements, with the exception of the light-emitting devices and, particularly in the case of radiant heating means, the heating elements.

According to a third preferred embodiment, the masking means is constituted by heterogeneities located within the plate or on its lower surface, especially texturings, said heterogeneities being capable of deforming the images by light radiation scattering or refraction phenomena.

These texturings may be obtained, in particular, during the forming of the plate, by rolling between two rolls, generally metal or ceramic rolls, one of which is provided with texturings. Various patterns capable of refracting the light are possible: portions of spheres, pyramids, etc. The typical dimensions of these patterns are between 0.2 and 1 mm.

If necessary, it is possible to limit or suppress this refraction in the zones located opposite the light-emitting devices by depositing, between the patterns of the texturing, a resin whose refractive index is close to that of the plate.

The heterogeneities may also be constituted by light-scattering crystals, which are located in the heart of the glass-ceramic plate. They may especially be crystals of β-quartz or of β-spodumene, the size of which is of the order of 300 to 1000 nm.

The glass-ceramic plate may, for example, contain crystals of different sizes depending on the zones, especially crystals that scatter the light in order to constitute a masking means in the zones opposite the internal elements to be masked, and crystals that do not scatter the light in the zones opposite the internal elements that it is not desired to mask. Such a difference in sizes according to the zone may be obtained by differential ceramization, by positioning, during the ceramization, at ad hoc locations of the plate, heat shields or cooling devices that limit the temperature experienced. Insofar as the ceramization process has an influence on the optical transmission of the plate, in particular due to its influence on the degree of reduction of the vanadium oxide, such a differential ceramization may also be used to selectively darken certain zones of the plate.

Another subject of the invention is a glass or glass-ceramic plate colored using vanadium oxide for a cooking device, said plate intrinsically having a light transmission ranging from 2.5% to 40% and an optical transmission of at least 0.6% for at least one wavelength within the region ranging from 420 to 480 nm, said plate being coated on at least one of its faces with a coating having the ability to absorb and/or reflect and/or scatter the light radiation.

This plate is preferably such that the coating is an organic-based layer, such as a layer of paint or of lacquer, or a mineral-based layer, such as an enamel or a metallic or metal oxide, nitride, oxynitride or oxycarbide layer. The preferred coatings are those described previously.

The invention will be better understood in light of the following nonlimiting examples.

Melted in a furnace heated using oxygen/natural gas burners are various mother glasses, having the compositions indicated in table 1 below. The melting temperature is of the order of 1650° C. The mother glass formed into a plate by rolling then undergoes a ceramization treatment in order to form a glass-ceramic, this treatment being carried out according to cycles comprising the steps a) to e) described previously. By way of indication, example 5 was ceramized according to a cycle involving a rise to 660° C. over 20 minutes, then a rise to 820° C. over 40 minutes, and to 930° C. over 20 minutes, with a hold of 15 minutes at this temperature. Example 6 was ceramized according to a faster cycle: 17 minutes up to 660° C., 25 minutes up to 820° C., 7 minutes up to 920° C., with a hold at this temperature for 10 minutes.

Composition C1 is a comparative example.

Table 1 indicates, for each example, besides its chemical composition by weight, the thickness of the plate (in mm), the optical transmission of the plate for a wavelength of 465 nm, and the light transmission according to the ISO 9050:2003 standard. The transmissions are those of the plate, at the thickness indicated.

TABLE 1

|  | C1 | 1 | 2 | 3 | 4 | 5 | 6 |
|---|---|---|---|---|---|---|---|
| $SiO_2$ | 64.7 | 65.6 | 65.5 | 65.5 | 65.5 | 69.9 | 67.2 |
| $Al_2O_3$ | 20.5 | 20.5 | 20.3 | 20.3 | 20.3 | 19.6 | 20.2 |
| $Li_2O$ | 3.8 | 3.7 | 3.8 | 3.8 | 3.8 | 3.5 | 3.7 |
| $TiO_2$ | 3.0 | 3.0 | 2.9 | 2.9 | 2.9 | 2.3 | 2.9 |
| $ZrO_2$ | 1.4 | 1.3 | 1.3 | 1.3 | 1.3 | 1.5 | 1.2 |
| ZnO | 1.5 | 1.5 | 1.5 | 1.5 | 1.5 | 1.7 | 1.5 |
| MgO | 0.4 | 0.3 | 0.4 | 0.4 | 0.4 | 0.95 | 0.4 |
| CaO | 0.4 | 0.4 | 0.5 | 0.5 | 0.5 | — | — |
| BaO | 2.5 | 2.5 | 2.6 | 2.6 | 2.6 | — | 2.5 |
| $Na_2O$ | 0.6 | 0.6 | 0.6 | 0.6 | 0.6 | — | — |
| $K_2O$ | 0.3 | 0.2 | 0.2 | 0.2 | 0.2 | — | — |
| MnO | 0.03 | 0.02 | — | — | — | — | — |
| $SnO_2$ | 0.25 | 0.3 | 0.29 | 0.29 | 0.29 | 0.22 | 0.29 |
| $Fe_2O_3$ | 0.09 | 0.09 | 0.1 | 0.085 | 0.085 | 0.04 | 0.09 |
| $V_2O_5$ | 0.025 | 0.03 | 0.03 | 0.03 | 0.025 | 0.06 | 0.03 |
| CoO | — | 0.015 | — | — | — | — | — |
| $Cr_2O_3$ | — | 0.001 |  |  |  | 0.001 | 0.001 |
| thickness (mm) | 4.0 | 4.0 | 4.0 | 4.0 | 4.0 | 3.0 | 3.0 |
| T (465 nm) | 0.4% | 1.2% | 0.7% | 1.1% | 1.6% | 3.0% | 2.0% |
| LT | 1.4% | 3.2% | 3.3% | 4.5% | 6.0% | 15.7% | 5.0% |

These glass-ceramic plates are converted in order to serve as cooking plates covering radiant heating elements.

A matte black paint that is resistant to high temperatures, based on silicone and alkyd resins, sold by Zolpan under the reference 376913 is applied to the lower surface of the plate by screen printing. The entire plate is covered, with the exception of the heating zones (opposite the heating elements) and display zones (opposite the light-emitting diodes). After baking at 200° C. in a tunnel oven for around 3 minutes, the layer of paint, which has a thickness of around 20 micrometers, is perfectly opaque, and therefore capable of masking the internal elements of the cooking device.

In the case of a plate intended for an induction cooking device, the plate would have advantageously been entirely covered with paint (on the lower face), with the exception of the zones opposite the light-emitting diodes.

The cooking device is obtained by customary means by combining the plate coated with its layer of paint (position facing the internal elements), with the various elements customarily used: radiant heating elements, electric wiring, electronic boards intended for managing the control, monitoring and display means, thermal insulators, display devices, mechanical fastening means, thermal limiters, the whole assembly being positioned in a sheet metal housing.

The display devices are light-emitting diodes that emit blue light (wavelength of 465 nm or of 428 nm) in the form of 7-segment displays. They may especially be displays sold by Forge Europa under the references FN1-0392B050JGW or FN1-0392B010JGW. The supply voltage of the diodes typically varies from 3 to 4 V.

The blue light-emitting diodes are perfectly visible through the plates according to the invention. This is not the case, on the other hand, for the plates having the composition and the optical properties of the plate C1. The display is barely visible, especially in the case of substantial lighting originating from outside. The excessively weak luminosity obtained in the case of the comparative example would make it necessary to significantly increase the intensity of the supply current of the diodes or to modify the supply circuit.

The luminance of displays that emit in the blue seen through the plates from examples 1 and C1 was also evaluated.

The measurements were carried out using a luminance meter positioned at a distance of 50 cm above a platform comprising four 7-segment blue displays. The device has a field of view that makes it possible to simultaneously visualize all the displays of the platform. The measurement of the luminance consists in recording an image with the luminance meter then in digitally processing the signal detected in order to extract the average value of the luminance emitted in the direction of the device. The measurement begins with a development of the image at the surface of the displays that are turned on. The luminance originating from the displays alone is then recorded, before successively positioning, at their surface, the samples of plates to be studied. During the measurement, the plates rest directly on the four displays.

The luminance measured through the comparative plate C1 is only 1.50 cd/m$^2$. Through the plate 1 on the other hand, the luminance increases to 3.11 cd/m$^2$.

The invention claimed is:
1. A cooking device, comprising:
   at least one first internal element, which is a heating element, a control element, a monitoring element, or any combination thereof;
   at least one second internal element, which is at least one light-emitting device;
   at least one glass or glass-ceramic plate colored with vanadium oxide covering the first and second internal elements: and
   at least one masking element which masks a part of the first and second internal elements, wherein the masking element (a) is disposed on top of, underneath, or within the plate and is made of light radiation scattering material and/or light radiation absorbing material and/or (b) is formed by heterogeneities located within the plate or on a lower surface thereof, the heterogeneities being configured to deform images by light radiation scattering or refraction phenomena,
wherein the at least one light-emitting device is selected from the group consisting of blue light emitting and white light emitting diodes, blue light emitting and white light emitting liquid crystal displays, and blue light emitting and white light emitting organic diode displays, light emitted by the at least one light-emitting device is not of red color when seen through the plate, the plate has a thickness ranging from 3 to 6 mm, and intrinsically has a light transmission ranging from 2.3% to 40% as determined by ISO 9050:2003 and an optical transmission of at least 0.6% for each wavelength within the region ranging from 420 to 480 nm,
wherein a weight content of the vanadium oxide, expressed in the form $V_2O_5$, in the at least one glass or glass-ceramic plate colored with vanadium oxide is in a range from 0.01 to 0.06%, and
wherein the masking element masks at least 50% of a surface occupied by the internal elements.

2. The device of claim 1, wherein the at least one first internal element comprises a heating element selected from the group consisting of an induction heating element and a radiant heating element.

3. The device of claim 2, wherein the heating element is an induction heating element, and the masking element is configured to mask all internal elements with the exception of the at least one light-emitting device.

4. The device of claim 2, wherein the heating element is a radiant heating element, and the masking element is configured to mask the first and second internal elements with the exception of the at least one light-emitting device and the heating element.

5. The device of claim 1, wherein the plate intrinsically has a light transmission ranging from 3% to 25%.

6. The device of claim 1, wherein the plate intrinsically has an optical transmission of at least 0.8% for each wavelength within the region ranging from 420 to 480 nm.

7. The device of claim 1, wherein the plate has a thickness ranging from 3 to 4 mm.

8. The device of claim 1, wherein the plate is a glass comprising borosilicate, aluminoborosilicate, or soda-lime-silicate, and wherein the plate is tempered.

9. The device of claim 1, wherein the plate is a glass-ceramic.

10. The device of claim 9, wherein the glass-ceramic plate is a lithium aluminosilicate, comprising by weight percent, based on a total mass of the lithium aluminosilicate:

| | |
|---|---|
| $SiO_2$ | 52-75%; |
| $Al_2O_3$ | 18-27%; |
| $Li_2O$ | 2.5-5.5%; |
| $K_2O$ | 0-3%; |
| $Na_2O$ | 0-3%; |
| $ZnO$ | 0-3.5%; |
| $MgO$ | 0-3%; |
| $CaO$ | 0-2.5%; |
| $BaO$ | 0-3.5%; |
| $SrO$ | 0-2%; |
| $TiO_2$ | 1.2-5.5%; |
| $ZrO_2$ | 0-3%; and |
| $P_2O_5$ | 0-8%. |

11. The device of claim 1, wherein the weight content of the vanadium oxide, expressed in the form $V_2O_5$, is in a range from 0.01 to 0.04%.

12. The device of claim 1, wherein the masking element is a coating on and/or under the plate.

13. The device of claim 12, wherein the coating is an organic-comprising layer or a mineral-comprising layer.

14. The device of claim 1, wherein the masking element is positioned under the plate.

15. The device of claim 1, wherein the masking element is formed by heterogeneities located within the plate or on a lower surface thereof, and the heterogeneities are configured to deform images by light radiation scattering or refraction phenomena.

16. The device of claim 1, wherein the plate intrinsically has a light transmission ranging from 3% to 10%.

17. The device of claim 1, wherein the plate intrinsically has a light transmission ranging from 3% to 5%.

18. The device of claim 1, wherein the plate intrinsically has an optical transmission of at least 1% for each wavelength within the region ranging from 420to 480 nm.

19. The device of claim 1, wherein the masking element is made of light radiation scattering material and/or light radiation absorbing material.

20. The device of claim 1, wherein the masking element masks at least 70% of the surface occupied by the internal elements.

21. The device of claim 1, wherein the masking element masks at least 80% of the surface occupied by the internal elements.

22. The device of claim 1, wherein the masking element masks at least 90% of the surface occupied by the internal elements.

23. The device of claim 1, wherein the at least one light-emitting device is selected from the group consisting of blue light emitting diodes, blue light emitting liquid crystal displays, and blue light emitting organic diode displays.

24. The device of claim 1, wherein the at least one light-emitting device is selected from the group consisting of white light emitting diodes, white light emitting liquid crystal displays, and white emitting organic diode displays.

* * * * *